United States Patent [19]
Kelly

[11] 3,838,496
[45] Oct. 1, 1974

[54] WELDING APPARATUS AND METHOD

[76] Inventor: Carl L. Kelly, 3115 165th St., Hammond, Ind. 46323

[22] Filed: Apr. 9, 1973

[21] Appl. No.: 349,296

[52] U.S. Cl.................. 29/484, 219/126, 219/137, 228/25, 228/32
[51] Int. Cl........................................ B23k 31/02
[58] Field of Search ...... 219/125, 126, 137; 228/25, 228/32; 29/464, 484, 493

[56] References Cited
UNITED STATES PATENTS

| | | | |
|---|---|---|---|
| 1,821,410 | 9/1931 | Taylor............................. | 219/126 X |
| 2,761,954 | 9/1956 | Westfall............................. | 219/126 |
| 2,794,901 | 6/1957 | Christensen et al. ................ | 219/126 |
| 3,666,158 | 5/1972 | Bieker et al. .......................... | 228/32 |

*Primary Examiner*—J. Spencer Overholser
*Assistant Examiner*—Robert J. Craig
*Attorney, Agent, or Firm*—Walter F. Wessendorf, Jr

[57] ABSTRACT

A method and apparatus improvement is disclosed for welding an elongated seam between adjacent metal plates with a plate crawler type welding unit that tracks the seam and that includes a leading or tracking portion positioned substantially in advance of a trailing or welding portion. A guide plate structure having an elongated slot is disposed in abutting relation to the metal plates with the slot aligned with the weld seam. The welding unit tracks onto the guide plate structure to permit completion of the seam weld. The guide plate structure is adjustable in effective thickness to effect a correspondence with various plates to be welded and is carried on a support means that permits independent three axis movement of the guide plate structure to select positions and transportation of the guide plate structure and supported welding unit between spaced welding sites.

11 Claims, 8 Drawing Figures

3,838,496

WELDING APPARATUS AND METHOD

INTRODUCTION

The present invention relates generally to apparatus and methods for welding metal plates or the like. More particularly, the present invention relates to a new and improved guide plate assembly and welding method that greatly simplifies the task of welding an elongated seam between adjacent metal plates with a plate crawler type welding unit or similar welding device.

The method and apparatus of the invention are disclosed in the context of a vertical seam welder for large metal plates such as are used in the fabrication of a storage tank facility and further in conjunction with a plate crawler type welding unit although those skilled in the art will recognize that both the method and apparatus of the invention have utility in other contexts.

BACKGROUND OF THE INVENTION

It is now conventional to weld seams between metal plates by means of a portable welding machine that tracks along the seam and is supported wholly by the adjacent plates. A commercial example of such a welding unit is the "ES-5 Vertical Electroslag Plate Crawler" manufactured and sold by the Linde Division of the Union Carbide Company. In such plate crawler type welding units, a tracking mechanism for advancing the unit along the plates usually precedes the welding station by a substantial distance, e.g., 18 inches to 2 feet. Accordingly, it is necessary to provide guiding of the welding unit for a corresponding distance beyond the end of the plates to be welded.

The foregoing guiding function is typically accomplished in one of two ways. First, a pair of elongated guide bars may be welded to the ends of the adjacent plates to form an effective elongated extension of the weld seam. In completing a weld seam, the welding unit is tracked onto the guide bars and the weld is in fact continued for several inches up the bars. The welding uit is then manually or mechanically lifted from the guide bars and moved to a new welding site. The guide bars are then shorn from the welded plates at the location at which they had originally been tack welded. The additional several inches of weld along the guide plates is required to assure a good weld since metal within an inch or so of the discontinuation of a weld usually develops stresses or cracks. Thus, the guide bars have virtually no reuse potential. Furthermore, in welding a vertical seam in a large storage tank, the successive tiers of metal plates are usually made progressively thinner since the hydrostatic pressure of the stored liquid is less at higher levels in the tank and imposes correspondingly less demand on the tank structure. Since the guide bars must be matched in thickness to the metal plates to be welded in order to assure proper tracking of the welding unit, it is necessary that a substantial inventory of such bars be on hand. The inconvenience and expense attendant the foregoing procedure is manifest.

An alternate form of prior art guide structure involves tack welding of small rectangular tabs to the metal plates on opposite sides of the weld seam so as to form a short extension of the seam on the order of 3 inches or so. Large guide plates approximately notched to accept the smaller tabs are then mechanically clamped to the respective metal plates in order to form a guide track of the requisite overall length. The alternate design has the advantage that the clamped plates are repeatedly reusable, only the small tabs being disposable. However, all of the other disadvantages of the former design remain.

SUMMARY OF THE INVENTION

The present invention provides an improved welding apparatus and method of welding that obviates the disadvantages of the prior art discussed above. The guide plate assembly of the invention is adjustable in thickness to accommodate varying metal plate thicknesses thereby avoiding the necessity of maintaining an inventory of different sized guide members. Additionally, the assembly of the invention is simply and easily located in its operative position and is easily and promptly disengaged following completion of the welding operation.

Transportation of the welding unit between welding sites is also facilitated by employment of the guide plate assembly as a carrier and by supporting the guide plate assembly from a movable support mechanism. The guide plate assembly may also sever as a carrier for the welding unit when the entire welding apparatus is transported between job sites.

Generally, the method aspect of the invention contemplates welding an elongated seam between adjacent metal plates with a plate crawler type welding unit constructed for tracking the seam in effecting a weld between the metal plates and with the leading portion of the welding unit being required to track the seam a substantial distance in advance of the welding station. More specifically, the method of the invention comprises transporting a slotted guide plate means from an inoperative to an operative position on a support means which support means provides for displacement of the guide plate means along each of three mutually perpendicular axes to a preselected coordinate position. The guide plate assembly is clamped in an operative position in abutment with the metal plates and with the guide plate slot in alignment with the seam. The effective thickness of the guide plate means is adjusted to effect a substantial correspondence with the thickness of the metal plates and the seam is thereafter welded by tracking the welding unit along the seam and completing the welb by tracking the unit onto the guide plate. The method operation is completed by unclamping the slotted guide plate from the metal plates and transporting the guide plate means and the welding unit supported thereon to a new welding site via the support means.

A first apparatus aspect of the invention contemplates an improved welding apparatus comprising a guide plate means having first and second plate members each with similar elongated slots formed therein and positioned in overlying relation to one another with the slots in registry and with the guide plates being adapted for positioning in abutting relation to the adjacent metal plates so as to effect alignment of the registered slots and the elongated seam. The guide plate members are notched on either side of the registered slots at a position adjacent their points of abutment with the metal plates for providing respective sites for run-off tabs to be secured to the adjacent metal plates so as to form a short extension of the elongated seam. A locating means is provided for releasably clamping the guide plate means to the metal plates. There are further provided adjustment means for effecting a variation in the spacing between the first and second guide plates to permit adjustment of the effective, combined thicknesses of the guide plates to a value substantially corresponding to the thickness of the adjacent metal plates for permitting the welding unit to track onto the guide plate means and along the registered slots and fully complete welding of the adjacent metal plates.

A further aspect of an improved welding apparatus according to the invention comprises guide plate means which may or may not be adjustable and locating means for releasably clamping the guide plate means to the adjacent metal plates. There is further provided in accordance with this aspect of the invention, a support and locating means for carrying the guide plate means and for selectively positioning the guide plate means in proper relation to a seam to be welded and further for permitting the welding unit to track onto the guide plate means along the elongated slot and fully complete welding of the adjacent metal plates. The support and locating means is further constructed and arranged for transporting the welding unit on the guide plate means between spaced welding sites.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figures 1, 1A:
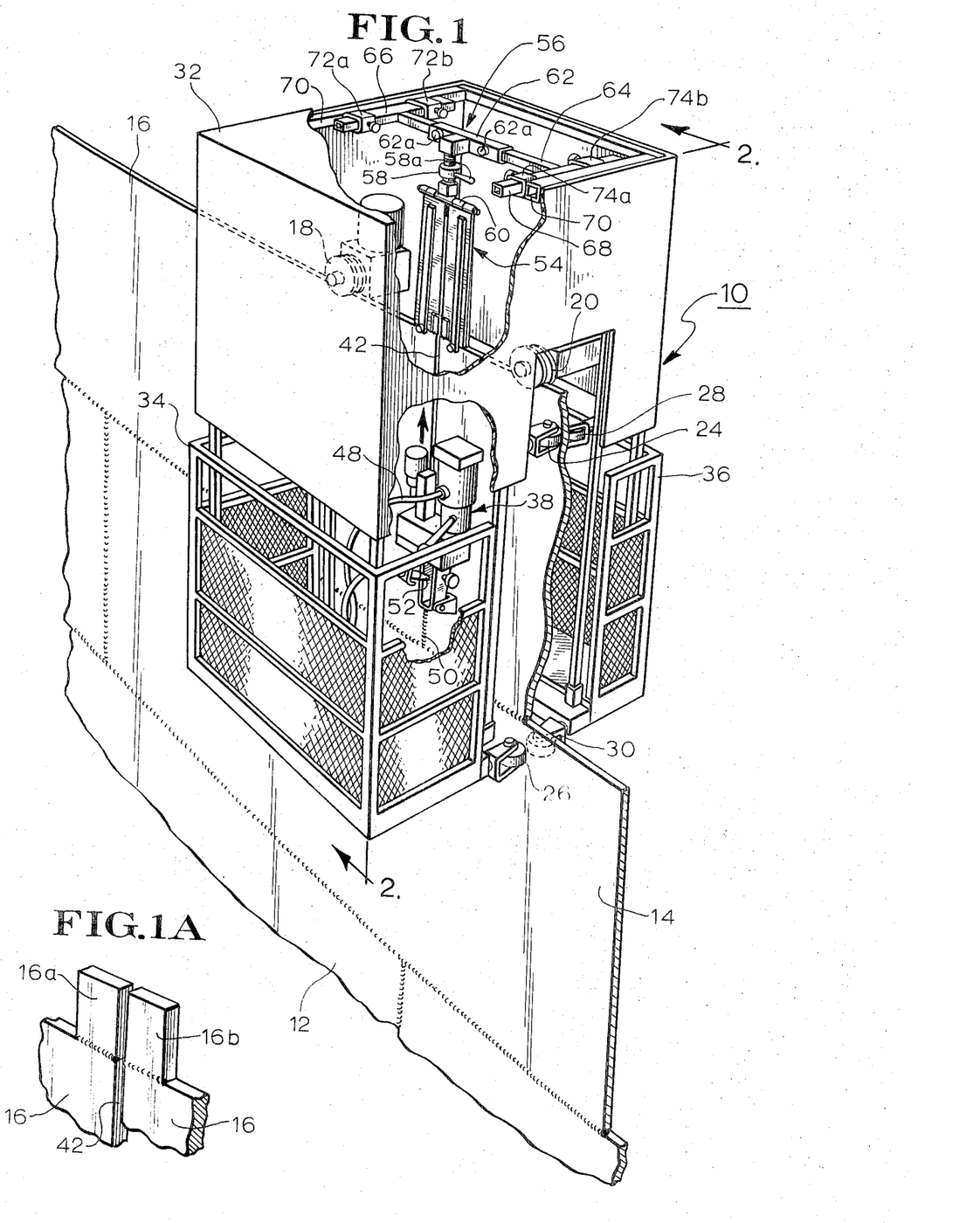
FIG. 1 is a perspective view, partly in section, of a vertical seam welding apparatus embodying the present invention.
FIG. 1A is a detail view illustrating a pair of run-off tabs tack welded to a pair of adjacent metal plates so as to form a short extension of the elongated seam between the plates.

Referring now to FIG. 1, the welding apparatus 10 there illustrated may, except for the invention presently to be described, be entirely conventional. The welding apparatus 10 is a vertical seam welder useful in the erection of storage tank sheels and the apparatus is illustrated in its operative position on such a tank shell. First and second tiers 12 and 14 of the metal ring plates composing the cylindrical tank are illustrated in position with the vertical and horizontal seams between the various plates of these tiers having been previously welded. A third tier of metal plates 16 is in the process of being welded in place by the welding apparatus 10. The welding apparatus 10 is disposed in conventional fashion so as to ride on the horizontal top edge of the metal plates 16 of the third or top tier.

Figure 3:
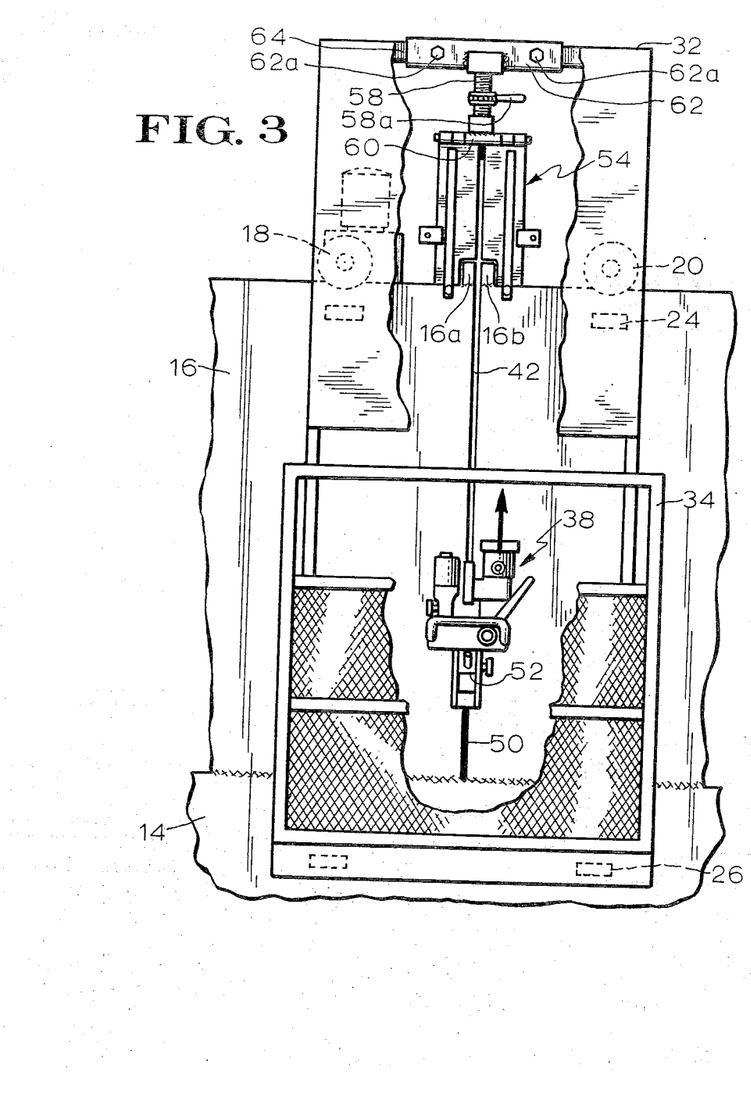
FIG. 3 is a sectional view taken along lines 3—3 of FIG. 2.

Basically, the welding apparatus 10 comprises a large cage assembly of an inverted, generally U-shaped configuration positioned with the top or rectangular cage portion forming the bight portion 32 of the U straddling the metal plate 16 of the upper tier and the leg portions comprising respective operator platforms 34 and 36 depending a substantial distance below and on opposite sides of the plates 16. The cage assembly is supported on the top edge of the plates 16 by a pair of spaced support and drive wheels 18 and 20. The support and drive mechanism 18 and 20 is wholly conventional and, therefore, is illustrated only in semi-schematic form in the drawing. Similarly, it is well understood that it is necessary to laterally stabilize the welding apparatus 10 and to this end there are provided opposed sets of stabilizing rollers on opposite sides of the plates. A first pair of such stabilizing rollers 24 and 26 are secured in spaced relation along the forward vertical edge of the work platform 34 so as to ride on the front of the plate 16 while a second pair of stabilizing rollers 28, 30 are secured in corresponding relation to the work platform 36 on the opposite side of the plates 16 so as to roll along the backside of the metal plates 16. Similar pairs of rollers are disposed at the opposite end of the apparatus, the set of these rollers 25 and 27 affixed to the platform 34 being visible in phantom outline in FIG. 3. The metal plates are firmly sandwiched between the rollers to assure appropriate lateral stability and tracking of the assembly 10 as it is advanced along the plates.

The upper cage portion 32 of the apparatus 10 is basically a rectangular metal frame suitably covered by a weather screen composed of a vinyl sheeting 37 or the like. The depending operator support platforms 34 and 36 are provided with appropriate metal frame safety railings about three sides of the platform base, the sides of the platforms facing the plates 16 being open to facilitate access to the work and since the plates themselves form a safety wall. The support platforms 34 and 36 may also be arranged so as to telescope at least partially within the upper cage portion 32 to provide a compact unit for transport between different job locations. The cage structure of the welding apparatus 10 will not be described in greater detail since, as previously stated, the apparatus may be conventional and is well understood to those familiar with the art.

Figure 2:
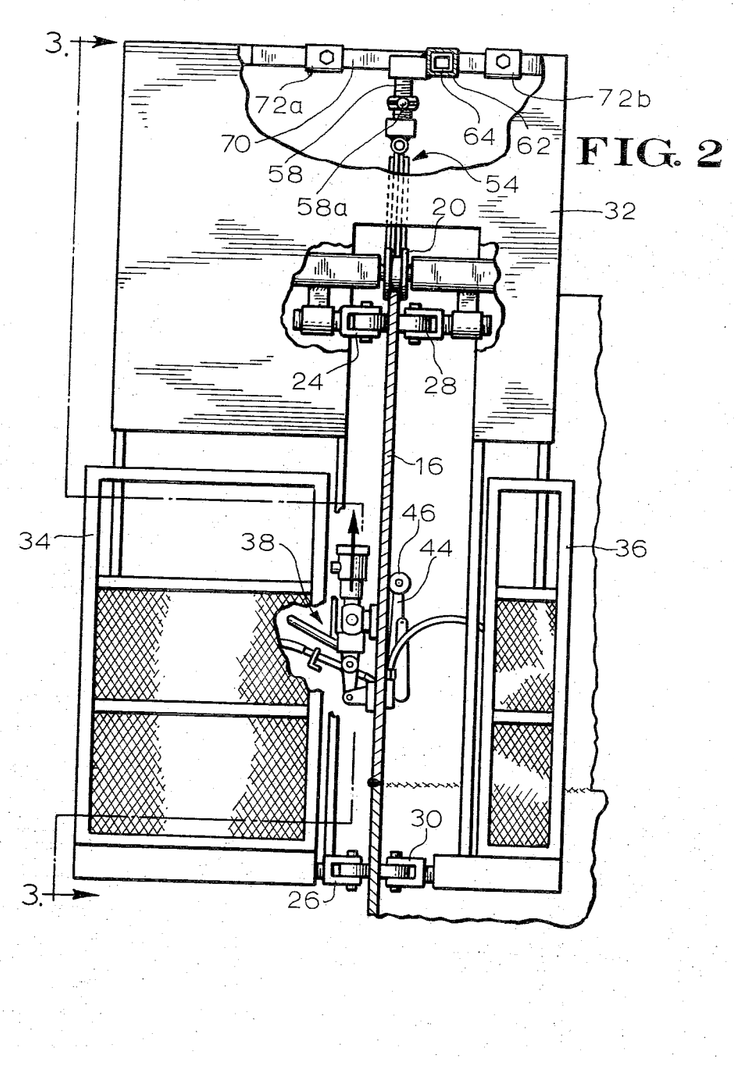
FIG. 2 is a side elevational view of the apparatus as taken along lines 2—2 of FIG. 1.

Within the cage of the welding apparatus 10, there is located a plate crawler type welding apparatus 38 for welding a vertical seam between a pair of adjacent plates, the seam between plates 16 being identified by the reference numeral 42 in the drawing. The welding unit 38 is itself conventional and may, for example, be the commercial unit identified earlier herein. The unit 38 is a light-weight portable assembly designed to provide continuous single-pass welding in a vertical orientation. The welding unit 38 is held on the metal plates by means of a connecting arm 44 (FIG. 2) which fits through the seam 42. The unit 38 is propelled up the seam 42 in the direction of the arrow illustrated in FIG. 1 by a knurled drive roller 46 supported on arm 44 and which digs into the surface of the metal plates. The self-supporting and self-tracking features of the welding unit 38 avoids the necessity of providing special overhead supports and staging for the welding equipment. The power and control apparatus for the welding unit 38 (not shown) is carried within the cage of the welding apparatus 10 and is interconnected to the unit 38 through a series of hoses and wires denoted generally by the reference numeral 48.

The welding unit 38 is shown in FIG. 1 having progressed a portion of the way up the seam 42 so as to effect a weld bead 50 at the base of the seam. As pointed out earlier, the tracking portion 44, 46 (FIG. 2) of the welding unit 38 tracks the weld seam 42 a substantial distance in advance of the welding station denoted by the reference numeral 52. Accordingly, in order to complete a weld at the top of the seam 42, it is necessary to effect a continued guiding of the welding unit 38 for a substantial distance beyond the upper end of the seam 42. It is also necessary to continue the actual weld for several inches above the top of the seam 42 in order that the shrinking and cracking attendant discontinuation of a weld shall occur in a waste piece that may be cut-off and discarded.

In accordance with the present invention, the requisite guiding of the welding unit 38 beyond the longitudinal extent of the seam 42 is effected by a guide plate assembly generally designated in the drawing by the reference numeral 54. The guide plate assembly 54 is suspended from the top of the welding cage 32 by a support and locating means generally designated by the reference numeral 56.

The support locating means 56 is adapted for selectively positioning the guide plate assembly 54 in proper relation to a seam to be welded. To this end, the support and locating means 56 is constructed for providing movement of the guide plate assembly 54 along three mutually perpendicular axes, preferrably the standard X, Y and Z axes. The support and locating means 56 comprises a conventional mechanical jack 58 having its longitudinal axis vertically oriented and having its lower end welded to the mid-point of a horizontally disposed sleeve member 60. The upper end of the jack 58 is fixedly secured to an elongated collar member 62. The jack 58 selectively elevates or lowers the guide plate assembly 54 upon actuation of its ratchet arm 58a.

The collar 62 comprises a hollow bar of rectangular cross-section slidably received about a guide bar 64. The guide bar 64 and its associated collar 62 lie along a horizontal or X axis that is perpendicular to the vertical or Z axis of the jack 58. The collar 62 is slidable between the longitudinal limits of the guide bar 64 and is selectively lockable at any location there along by means of a pair of locking screws 62a threaded through one side wall of the collar 62 and designed to frictionally engage an adjacent side wall of the guide bar 64.

The opposite ends of the guide bar 64 are fixedly secured to the approximate mid-points of a pair of similar hollow rectangular bars 66 and 68. The bars 66 and 68 are supported in similar fashion from opposite sides of a rectangular bar network 70 which defines the top of the welding cage 32. Specifically, the bar 66 is slidably mounted in a pair of spaced collars 72a and 72b which in turn are fixedly secured to the adjacent frame member 70. Similarly, the bar 68 is slidably mounted in collars 74a and 74b which likewise are fixedly secured to an adjacent portion of frame member 70. The bars 66 and 68 together with the cross member 64 define a rigid network of an H-like configuration, the bar lets 66 and 68 of the H being movable along a Y axis that is mutually perpendicular to the Z axis of jack 58 and the X axis of bar 64. The collar pairs 72a, 72b and 74a, 74b are each provided with conventional locking bolts similar to bolts 62a for securing the bars 66 and 68 at any selected position between their limits of travel.

In summary, the support and locating means 56 provides a suitable range of movement of the guide plate assembly 54 along each of three mutually perpendicular axes so as to permit location of the guide plate assembly 54 in any preselected position. Although the particular form of support and locating means here illustrated is manually operable, it will be recognized by those skilled in the art that a power assist may be provided along each or all of the three axes and that a wide variety of alternative structures may be substituted for the exemplary support and locating mechanism illustrated, all without departing from the present invention.

Figures 4, 5, 6, 6A:
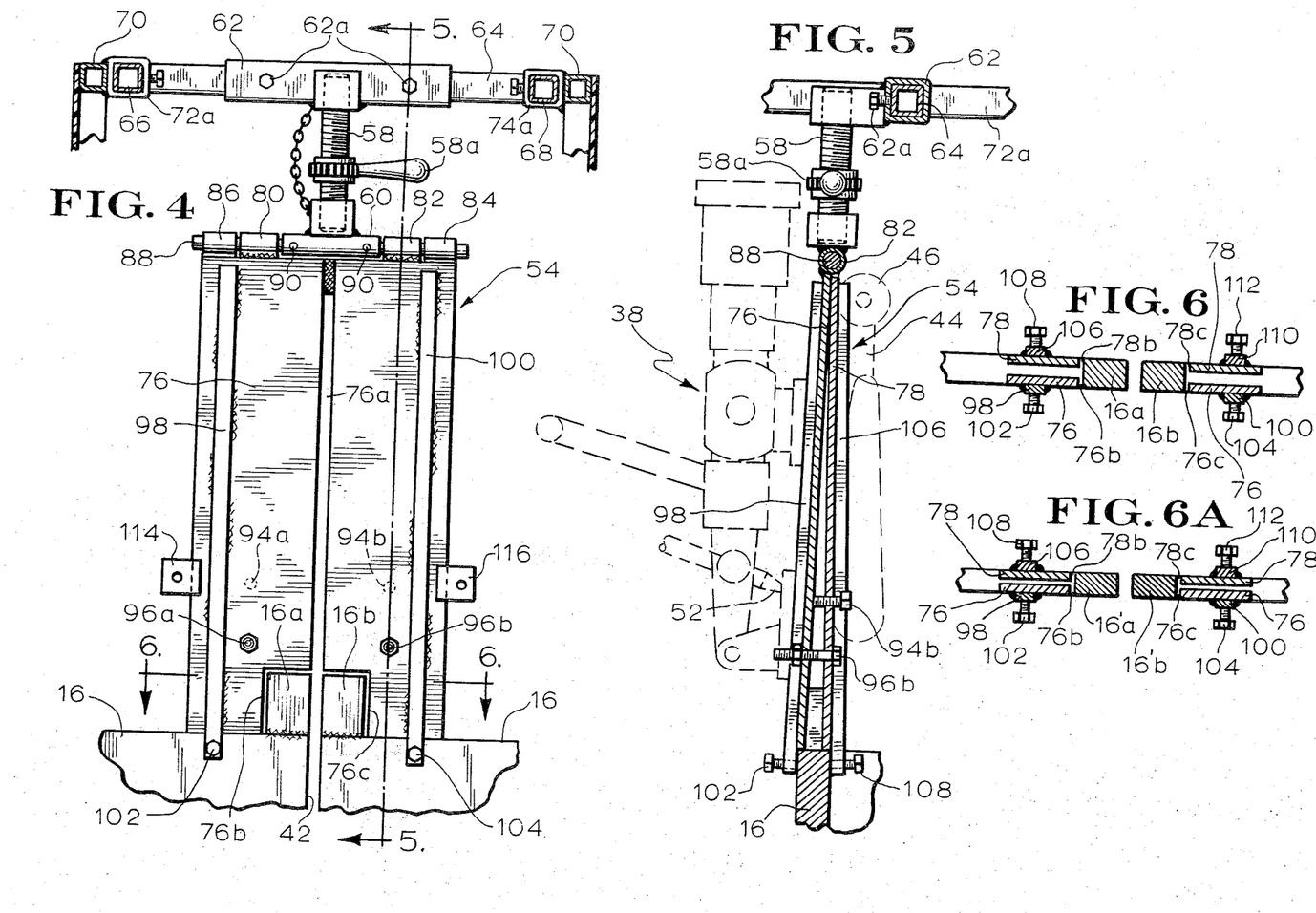
FIG. 4 is an enlarged, elevational view of the guide plate assembly of the present invention.
FIG. 5 is a sectional view taken along lines 5—5 of FIG. 4.
FIG. 6 is a partial sectional view of FIG. 4 taken along lines 6—6 of FIG. 4.
FIG. 6A is a view similar to that of FIG. 6 but showing the guide plates adjusted to match a thinner pair of adjacent metal plates.

Referring now to FIGS. 4–6, the structure and function of the guide plate assembly 54 may be appreciated in detail. The assembly 54 comprises first and second rectangular guide plate members 76 nd 78 each having a similar elongated slot formed therein, only the elongated slot 76a of the first or front plate 76 being visible in the drawing. The slot 76a, like its counterpart not shown, extends from the bottom of the plate 76 vertically along the mid-line of the plate terminating only a short distance from the top of the plate.

The plates 76 and 78 are positioned in overlying relation to one another with their respective and similarly dimensioned slots in registry. The guide plates 76 and 78 are joined together at their upper ends by means of a hinge ssembly. The upper edge of the plate 76 is welded to a pair of spaced sleeves 80, 82 while the guide plate 78 is welded to a pair of sleeves 84, 86 that are laterally offset outwardly of the sleeves 80, 82. A central sleeve portion 60 rigidly secured to the lower end of the jack 58 is disposed intermediate the hinge sleeves 80, 82. The several sleeves members 60, 80, 82, 84 and 86 are axially aligned and supported on a common cylindrical bar 88. The bar 88 is fixedly secured to the central sleeve 60 by a pair of removable pins 90. The guide plates 76 and 78 are freely rotatable about the axis of the hinge bar 88.

The overlying guide plates 76, 78 are selectively positionable via the support and locating means previously described so as to assume a proper alignment with a seam 42 between adjacent metal plates 16. Specifically, it is contemplated in accordance with the present invention that small run-off tabs 16a, 16b be tack welded to the upper edges of the adjacent metal plates 16, the tabs 16a, 16b forming a short extension of the weld seam 42, perhaps on the order of three inches or so, as is most clearly seen in the detail FIG. 1A. The guide plates 76, 78 are correspondingly notched adjacent their points of abutment with the metal plate 16 in order to accommodate the run-off tabs. Only the notches 76b and 76c lying on opposite sides of the elongated slot 76a of the guide plate 76 are visible in the drawing of FIG. 4; however, the corresponding notches 78b–c of plate 78 are partially visible in FIG. 6.

In accordance with the present invention, the guide plate assembly 54 is selectively adjustable in effective thickness so as to correspond to the thickness of various metal plate thicknesses. Such matching of the thickness of the guide plate means to the effective thickness of the metal plates being welded is essential to assure that the welding unit 38 will properly track onto the guide plate assembly 54. Any abrupt transition in effective thickness of the seam being tracked by the welding unit 38 will result in a stalling of the tracking mechanism of the welding unit. Accordingly, there is provided an adjustment means for effecting a variation in the spacing between the guide plates 76, 78 to permit adjustment of the combined thicknesses of the guide plates to a value substantially corresponding to the thickness of the plate 16.

This adjustment means comprises in the illustrated embodiment respective pairs of threaded bolt members 94a–b and 96a–b. As seen most clearly in FIG. 5, the bolt 94b is threadably received in the guide plate 78 and extends therethrough so as to bear on the backside of the guide plate 76. The bolt 94b and its identical counterpart 94a are designed to force the plates 76, 78 apart to a desired separation distance. Conversely the bolt member 96b is freely journalled in an aperture in plate 78 and is threadably secured in a guide plate 76; the bolt member 96a is identically arranged. The bolts 96a, 96b are designed to draw the guide plates 76, 78 toward one another. Thus, adjustment of the effective thickness of guide plates 76, 78 requires a coordinated or appropriately sequential operation of the adjusting bolts 94a–b and 96a–b. The guide plates are illustrated in FIG. 6 as matched to the thickness of the plates 16. The guide plates are depicted in FIG. 6A as having been adjusted to match the thickness of substantially narrower plates 16' and their associated run-off tabs 16'a and 16'b. The provision of the dual, opposing adjustment provides secure and positive location of the guide plates at any selected position between a minimum and maximum thickness value, in the present instance from a minimum of about ½ inch to a maximum of about 2 inches.

The guide plates 76, 78 are securely positioned in alignment with the weld seam 42 by a locating means that releasably clamps the guide plates to the metal plates 16. Specifically, a pair of clamping bars 98 and 100 are welded adjacent the opposed vertical edges of the front face of the guide plate 76, the lower ends of the clamping bars 98, 100 extending below the terminus of the guide plate 76 is overlying relation to the metal plates on opposite sides of the weld seam 42. The clamping bars 98, 100 are provided at their lower ends with respective bolts 102 and 104 threaded through the bars so as to bear on respective segments of the metal plate 16. Similarly metal bars are provided on the face portion of the guide plate 78, only one of the bars 196 and its associated bolt 108 being visible in FIG. 5; the remaining bar 110 and bolt 112 are partially visible in FIG. 6.

When the guide plates 76, 78 are fixed in any preset angular position, tightening of the clamping bolts 102, 104, 108 and 112 applies a gripping pressure to the metal plates 16 such as to securely locate the guide plate assembly in position.

During transport of the welding apparatus 10 between job locations, it is desirable to lock the guide plate assembly against movement. To this end, apertured tabs 114 and 116 are welded to opposed sides of the guide plate 76. The tabs 114 and 116 provide means for bolting the guide plate assembly to the adjacent frame (not shown) of the welding apparatus 10.

The operation of the guide plate assembly of the invention may best be understood by referring initially to FIG. 1. As there shown, the cage of the welding apparatus 10 has been advanced along the plates 16 to the point whereat the apparatus 10 is centered over the vertical seam 42 to be welded and the guide plate assembly 54 has been located in alignment with the seam 42 via the locating and support means 56. Additionally, the welding unit 38 has been actuated by the operator and is advancing up the seam 42 leaving in its wake a welded bead 50 joining the plates 16. The welding unit 38 is advanced and welding operation continued by the operator in a manner well known and understood to those skilled in the art. As the unit 38 approaches the end of the weld seam 42, the knurled drive wheel 46 will advance initially onto the small run-off tabs 16a, 16b which are selected to be of a thickness corresponding to the metal plate 16 and are tack welded to these plates to form an extension of the seam. Continued advancement of the welding unit 38 results in its tracking along the registered slots 76a, 78a of the overlying guide plates 76, 78, the guide plates having been adjusted previously to match the effective thickness of the metal plates being welded.

The welding operation continues as the welding unit 38 progresses up the registered slots 76a, 78a until a substantial portion of the extension of the seam intermediate the run-off tabs 16a, 16b have been welded. The welding operation is then stopped but the unit 38 is permitted to track a short distance further such that its lower end is clear of the run-off tabs 16a, 16b. The welding unit 38 is shown in phantom outline in FIG. 5 having tracked entirely onto the guide plate assembly 54. At this point, the clamping bolts 102, 104, 108 and 112 are loosened and the jack 58 is actuated through the ratchet arm 58a to lift the guide plate assembly clear of the run-off tabs 16a, 16b. The assembly 54 may also be moved laterally back or to one side of the former welding site by sliding the guide bars 66, 68 in their respective collars or by sliding the collar 62 along the guide bar 64.

The run-off tabs 16a, 16b are cut off flush with the top of the metal plates 16 and the entire apparatus 10 is then ready for advancement to a new welding site. In this regard, the welding unit 38 is carried on the guide plate assembly itself in movement to the new site. Furthermore, with the guide plate assembly 54 secured to the frame of the welding apparatus through the locking tabs 114 and 116 the welding unit 38 may conveniently be carried on the guide plate assembly when the welding apparatus 10 is moved from one job location to another.

Although the improved welding apparatus of the invention has been illustrated in the context of a vertical seam welder used in the erection of storage tanks, it will be recognized and understood by those skilled in the art that the invention has application in a range of other environments and with the plates to be welded disposed in any orientation. Also, the invention is useful in conjunction with any type of welding unit that tracks along a seam between plates and requires guidance beyond the extremity of the plates to be welded, such types of welding units being generically defined herein as "plate crawler" welding units.

I claim:

1. In welding apparatus for welding an elongated seam between adjacent metal plates and including a welding unit of a plate crawler type for tracking said seam in effecting a weld therebetween and being required to track said seam a substantial distance in advance of the welding site, the improvement comprising:

guide plate means comprising first and second plate members each having similar elongated slots formed therein and positioned in overlying relation to one another with said slots in registery and with said guide plates being adapted for positioning in abutting relation to said adjacent metal plates so as to effect alignment of said registered slots and said elongated seam, said guide plate members being notched on either side of said registered slots at a position adjacent their point of abuttment with said metal plates for providing respective sites for run-off tabs to be secured to said adjacent metal plates so as to form a short extension of said elongated seam;

locating means for releasably clamping said guide plate means to said metal plates; and adjustment means for effecting a variation in the spacing between said first and second guide plates to permit adjustment of the effective, combined thickness of said guide plates to a value substantially corresponding to the thickness of said adjacent metal plates for permitting said welding unit to track onto said guide plate means and along said registered slots and fully complete welding of said adjacent metal plates.

2. The improvement of claim 1 and further comprising support and locating means for carrying said guide plate means and said welding unit between spaced welding sites and for positioning said guide plates in proper relation to a seam to be welded.

3. The improvement of claim 2 in which said guide plate means includes a hinge structure for hingeably coupling said guide plates to one another along aligned edges thereof remote from said registered slots and along an axis transverse to the axis of said registered slots.

4. The improvement of claim 3 in which said support and locating means comprises respective members for permitting movement of said guide plate means independently along each of X, Y and Z axes and for releasably locking said guide plate means at a preselected coordinate position and further in which said support and locating means is coupled to said guide plate means at said hinge structure.

5. The improvement of claim 4 in which said adjustment means comprises a first set of bolts for displacing said guide plates away from one another and a second set of bolts for drawing said plates toward one another for assuring a secure and positive positioning of said guide plates relative to one another at any relative spacing therebetween.

6. The improvement of claim 5 in which said members of said support and locating means comprise respectively a jack having one end coupled to said hinge structure and having a longitudinal axis corresponding to one of said X, Y and Z axes, a first sleeve member and a first collar secured to the opposite end of said jack and slideably disposed on said first sleeve and selectively lockable thereto with the axis of said first sleeve corresponding to a second of said axes, and second and third sleeve members disposed parallel to one another and lying parallel to the third of said axes and second and third collar members coupled to opposite ends of said first sleeve member and slideably disposed on said second and third sleeve members respectively and selectively lockable thereto for independently moving said guide plate means along each of said X, Y and Z axes to a preselected coordinate position.

7. In a welding apparatus for welding an elongated seam between adjacent metal plates and including a welding unit of a plate crawler type for tracking said seam in effecting a weld therebetween and with the leading portion of said welding unit being required to track said seam a substantial distance in advance of the welding site, the improvement comprising:

guide plate means having an elongated slot formed therein and being adapted for positioning in abutting relation to said adjacent metal plates so as to effect an alignment of said elongated slot and said seam, said guide plate means being notched on either side of said slot at a position adjacent the point of abuttment with said metal plates for providing respective sites for run-off tabs to be secured to said adjacent metal plates so as to form a short extension of said elongated seam;

locating means for releasably clamping said guide plate means to said metal plates; and support and locating means for carrying said guide plate means and for selectively positioning said guide means in proper relation to a seam to be welded for permitting said welding unit to track onto said guide plate means along said elongated slot and fully complete welding of said adjacent metal plates, said support and locating means being further constructed and arranged for transporting said welding unit on said guide plate means between spaced welding sites.

8. The improvement of claim 7 in which said support and locating means comprises respective members for permitting movement of said guide plate means independently along each of X, Y and Z axes and for releasably locking said guide plate means at a preselected coordinate position.

9. The improvement of claim 8 in which said members of said support and locating means comprise respectively a jack having one end coupled to said guide plate means and having a longitudinal axis corresponding to one of said X, Y and Z axes, a first sleeve member and a first collar secured to the opposite end of said jack and slideably disposed on said first sleeve and selectively lockable thereto with the axis of said first sleeve corresponding to a second of said axes, and second and third sleeve members disposed parallel to one another and lying parallel to the third of said axes and second and third collar members coupled to opposite ends of said first sleeve member and slideably disposed on said second and third sleeve members respectively and selectively lockable thereto for independently moving said guide plate means along each of said X, Y and Z axes to a preselected coordinate position.

10. The improvement of claim 9 in which the effective thickness of said guide plate means is adjustable between predetermined limit values for effecting a correspondence in thickness to that of said adjacent metal plates to effect a reliable tracking of said welding unit onto said guide plate means.

11. A method of welding an elongated seam between adjacent metal plates with a plate crawler type welding unit constructed for tracking said seam in effecting a weld between said metal plates and with the leading portion of said welding unit being required to track said seam a substantial distance in advance of the welding site, said method comprising the steps of:

transporting a slotted guide plate means from an inoperative to an operative position on a support means providing displacement of said guide plate means along each of three mutually perpendicular axes to a preselected coordinate position;

clamping said slotted guide plate means to said metal plates in an operative position in abuttment with said metal plates and with the guide plate slot in alignment with said seam;

adjusting the effective thickness of said guide plate means to effect a substantial correspondence with the thickness of said metal plates;

welding said seam by tracking said welding unit along said seam and completing said weld by tracking said weld unit onto said guide plate means;

unclamping said slotted guide plate means from said metal plates; and     transporting said guide plate means and welding unit supported thereon to a new welding site via said support means.

* * * * *

PO-1050
(5/69)

UNITED STATES PATENT OFFICE
CERTIFICATE OF CORRECTION

Patent No. 3,838,496  Dated October 1, 1974

Inventor(s) Carl L. Kelley

It is certified that error appears in the above-identified patent and that said Letters Patent are hereby corrected as shown below:

In the Heading:

Inventor's name should be "Carl L. Kelley".

Assignee should be "Aerojet-General Corporation".

Attorney should be "Edward O. Ansell".

Column 1, line 66, "approximately" should be "appropriately";

Column 2, line 23, "sever" should be "serve"; line 47, "welb" should be "weld";

Column 7, line 46, "is" should be "in"; line 52, "196" should be "106".

Signed and Sealed this twenty-ninth Day of July 1975

[SEAL]

Attest:

RUTH C. MASON
*Attesting Officer*

C. MARSHALL DANN
*Commissioner of Patents and Trademarks*